(12) United States Patent
Farrar et al.

(10) Patent No.: US 11,146,836 B1
(45) Date of Patent: Oct. 12, 2021

(54) DETECTION AND SYNCHRONIZATION OF AUDIO TRANSMISSIONS USING COMPLEX AUDIO SIGNALS

(71) Applicant: LISNR, Cincinnati, OH (US)

(72) Inventors: Rebekah Farrar, Columbus, OH (US); Oz Mendel, Piedmont, CA (US); William Knauer, Bellevue, KY (US)

(73) Assignee: LISNR, Cincinnati, OH (US)

( * ) Notice: Subject to any disclaimer, the term of this patent is extended or adjusted under 35 U.S.C. 154(b) by 0 days.

(21) Appl. No.: 16/879,333

(22) Filed: May 20, 2020

(51) Int. Cl.
*H04N 21/242* (2011.01)
*H04H 20/18* (2008.01)

(52) U.S. Cl.
CPC .......... *H04N 21/242* (2013.01); *H04H 20/18* (2013.01)

(58) Field of Classification Search
None
See application file for complete search history.

(56) References Cited

U.S. PATENT DOCUMENTS

| | | | |
|---|---|---|---|
| 9,002,487 B2* | 4/2015 | Choi | H04H 20/31 700/94 |
| 2015/0036464 A1* | 2/2015 | Moriguchi | H04B 11/00 367/137 |

OTHER PUBLICATIONS

Kim et al., "A Data-Over-Sound Application: Attendance Book", IEICE, APNOMS, 2019 (Year: 2019).*
International Search Report corresponding to related International Application No. PCT/US2021/033096, dated Jun. 28, 2021, 3 pages.
International Written Opinion corresponding to related International Patent Application No. PCT/US2021/033096, dated Jun. 28, 2021, 3 pages.
Kim et al., "A Data-Over-Sound Application: Attendance Book", IEICE, Asia-Pacific Network Operations and Management Symposium (APNOMS), 2019, 4 pages.

* cited by examiner

*Primary Examiner* — James R Marandi
(74) *Attorney, Agent, or Firm* — K&L Gates LLP

(57) ABSTRACT

Methods and systems for improved detection of audio transmissions are provided. In one embodiment, a method is provided that includes receiving an audio signal containing an audio transmission. The audio transmission may contain a predetermined portion that was initially generated based on an expected sequence of complex-valued signals. A real portion of the expected sequence of complex-valued signals may be compared to the received audio signal to identify a first portion of the received audio signal. A complex portion of the expected sequence may be compared to portions of the received audio signal near the first portion of the received audio signal to identify a second portion of the received audio signal. An arrival time of the audio transmission may be determined based on the second portion of the received audio signal.

20 Claims, 14 Drawing Sheets

DETECTION AND SYNCHRONIZATION OF AUDIO TRANSMISSIONS USING COMPLEX AUDIO SIGNALS

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative methods and systems for detecting and the arrival of audio transmissions that contain data. In a first aspect, a method is provided that includes receiving an audio signal that contains an audio transmission, the audio transmission containing (i) a predetermined portion and (ii) data for transmission using the audio transmission, and computing a first plurality of similarity measures between (i) a real portion of an expected sequence of complex values and (ii) a first plurality of portions of the audio signal, the first plurality of portions of the audio signal beginning at a first plurality of times. The method may further include determining that a first portion of the audio signal from among the first plurality of portions of the audio signal corresponds to the largest of the first plurality of similarity measures, the first portion of the audio signal beginning at a first time from among the first plurality of times, and computing a second plurality of similarity measures between (i) the real portion of the expected sequence and an imaginary portion of the expected sequence of complex values and (ii) a second plurality of portions of the audio signal, the second plurality of portions of the audio signal beginning at a second plurality of times. The method may also include determining that a second portion of the audio signal from among the second plurality of portions of the audio signal corresponds to the largest of the second plurality of similarity measures, the second portion of the audio signal beginning at a second time from among the second plurality of times and determining an arrival time of the audio transmission based on the second time.

In a second aspect according to the first aspect, the second plurality of times occur within a predetermined threshold time difference of the first time.

In a third aspect according to the first aspect, the predetermined threshold time difference is less than or equal to 1 millisecond.

In a fourth aspect according to the third aspect, the predetermined time difference is less than or equal to 0.5 milliseconds.

In a fifth aspect according to any of the second through fourth aspects, the predetermined threshold time difference is determined as a number of audio samples.

In a sixth aspect according to the fifth aspect, the predetermined threshold time difference is less than or equal to 15 audio samples.

In a seventh aspect according to any of the first through sixth aspects, the real portions of the expected sequence indicate magnitudes for samples of the expected sequence.

In an eighth aspect according to any of the first through seventh aspects, the imaginary portions of the expected sequence indicate phase differences for samples of the expected sequence.

In a ninth aspect according to the eighth aspect, the predetermined portion of the audio transmission is initially transmitted to include the real portion of the expected sequence and the phase differences indicated by the imaginary portion of the expected sequence.

In a tenth aspect according to any of the first through ninth aspects, the first plurality of portions of the audio signal and the second plurality of portions of the audio signal contain only real-valued audio signals.

In an eleventh aspect according to any of the first through tenth aspects, the expected sequence of complex values is a continuous linear phase chirp signal.

In a twelfth aspect according to any of the first through eleventh aspects, the at least one of the first plurality of similarity measures and the second plurality of similarity measures are calculated as correlation measures.

In a thirteenth aspect according to any of the first through twelfth aspects, the correlation measures include convolution measures.

In a fourteenth aspect, a system is provided that includes a processor and memory. The memory may store instructions which, when executed by the processor, cause the processor to receive an audio signal that contains an audio transmission, the audio transmission containing (i) a predetermined portion and (ii) data for transmission using the audio transmission and compute a first plurality of similarity measures between (i) a real portion of an expected sequence of complex values and (ii) a first plurality of portions of the audio signal, the first plurality of portions of the audio signal beginning at a first plurality of times. The memory may also store instructions which, when executed by the processor, cause the processor to determine that a first portion of the audio signal from among the first plurality of portions of the audio signal corresponds to the largest of the first plurality of similarity measures, the first portion of the audio signal beginning at a first time from among the first plurality of times and compute a second plurality of similarity measures between (i) the real portion of the expected sequence and an imaginary portion of the expected sequence of complex values and (ii) a second plurality of portions of the audio signal, the second plurality of portions of the audio signal beginning at a second plurality of times. The memory may store further instructions which, when executed by the processor, cause the processor to determine that a second portion of the audio signal from among the second plurality of portions of the audio signal corresponds to the largest of the second plurality of similarity measures, the second portion of the audio signal beginning at a second time from among the second plurality of times and determine an arrival time of the audio transmission based on the second time.

In a fifteenth aspect according to the fourteenth aspect, the second plurality of times occur within a predetermined threshold time difference of the first time.

In a sixteenth aspect according to the fifteenth aspect, the predetermined threshold time difference is determined as a number of audio samples.

In a seventeenth aspect according to any of the fourteenth through sixteenth aspects, the imaginary portions of the expected sequence indicate phase differences for samples of the expected sequence.

In an eighteenth aspect according to the seventeenth aspect, the predetermined portion of the audio transmission is initially transmitted to include the real portion of the expected sequence and the phase differences indicated by the imaginary portion of the expected sequence.

In a nineteenth aspect according to any of the fourteenth through eighteenth aspects, the first plurality of portions of the audio signal and the second plurality of portions of the audio signal contain only real-valued audio signals.

In a twentieth aspect according to any of the fourteenth through nineteenth aspects, the expected sequence of complex values is a continuous linear phase chirp signal.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to synchronizing the processing of audio transmissions containing data. Further, various aspects relate to synchronizing the processing by determining a time of arrival for audio transmissions.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
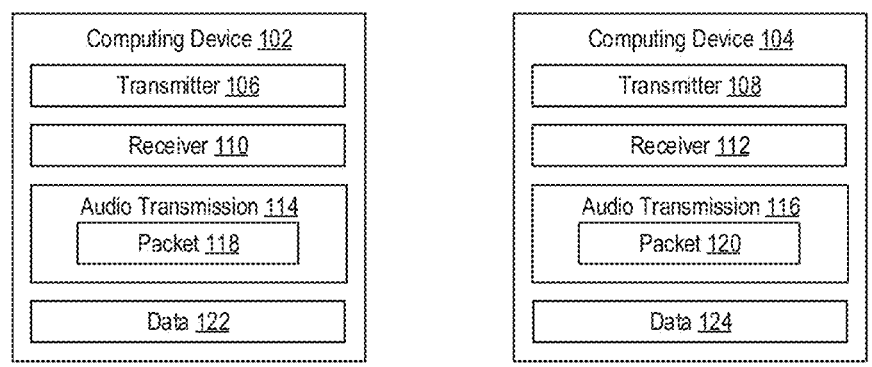
FIG. 1 illustrates a system according to an exemplary embodiment of the present disclosure.

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a microphone external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smartphone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing at least one speaker and at least one microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, audio transmissions are susceptible to types of interference and/or distortions that are either not present or less prevalent for data transmissions by electromagnetic signals. For instance, different frequencies utilized by the audio transmission may attenuate differently, causing certain frequencies to appear larger in magnitude when received by another computing device. Further, over longer distances, the magnitude of the audio transmission when received may decrease, reducing the signal-to-noise ratio for the received audio transmission. Also, audio transmissions may be subjected to delay (e.g., phase shifts and other delays) created by transmission through an audio channel (e.g., created by the transmitters or receivers, introduced by the environment through which the audio transmission traveled).

Therefore, there exists a need to account for these types of interference with audio transmissions. One solution to this problem is to detect audio transmissions with multiple receivers and to combine the audio signals from the multiple receivers. Certain types of interference (e.g., environmental noise or disruptions) may tend to be uncorrelated between different receivers (e.g., received at different magnitudes, received at different times, and/or not received at certain receivers). By contrast, the contents of the audio transmission received by the multiple receivers may be constant and therefore correlated between the different receivers (e.g., received in the same sequence at slightly different times). Therefore, combining the audio signals from the multiple receivers may increase the relative magnitude of the correlated portions of the audio signals (e.g., the audio transmission) while decreasing the relative magnitude of the uncorrelated portions of the audio signals (e.g., sources of interference). Accordingly, the combined audio signal may have a higher signal-to-noise ratio than the individual audio signals received by the multiple receivers. However, the audio transmission may not be received by all receivers connected to a particular computing device. Therefore, before combining the audio signals, the receivers that received the audio transmission may need to be identified. Also, receivers with lower magnitudes of the audio transmission may be more likely to include noise or other inaccurate symbols (e.g., other audio transmissions), which may reduce the signal-to-noise ratio of the combined audio signals. Therefore, the receivers with the largest magnitude of the audio transmission may need to be identified prior to combining the audio signals.

Figure 2:
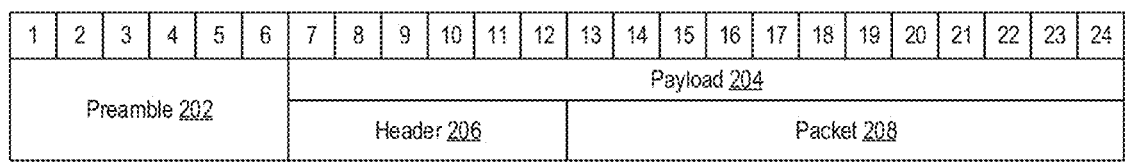
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 milliseconds (ms) of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may be additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined frequencies produced at predetermined points of time (e.g., according to a frequency pattern). In certain implementations, the preamble 202 may additionally or alternatively contain frequencies (e.g., a particular predetermined frequency) whose phase differences are altered by predetermined amounts at predetermined points of time (e.g., according to a phase difference pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120, which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

The preamble 202 and the payload 204 may be modulated to form the audio transmission 200 using similar encoding strategies (e.g., similar encoding frequencies and/or phase differences). Accordingly, the preamble 202 and the payload 204 may be susceptible to similar types of interference (e.g., similar types of frequency-dependent attenuation and/or similar types of frequency-dependent delays). Proper extraction of the payload 204 from the audio transmission 200 may rely on proper demodulation of the payload 204 from an audio carrier signal. Therefore, to accurately receive the payload 204, the computing device receiving the audio transmission 200 must account for the interference.

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

Figure 3A:
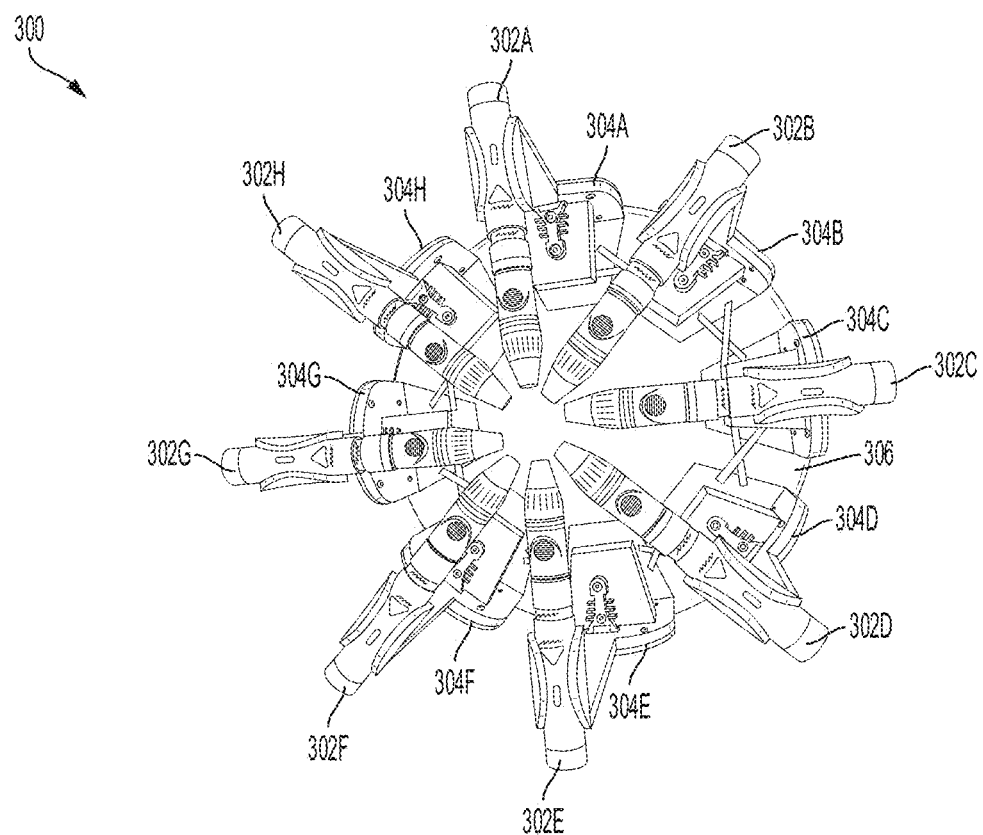
FIGS. 3A-3B illustrate transmitter/receiver array according to an exemplary embodiment of the present disclosure.
Figure 3B:
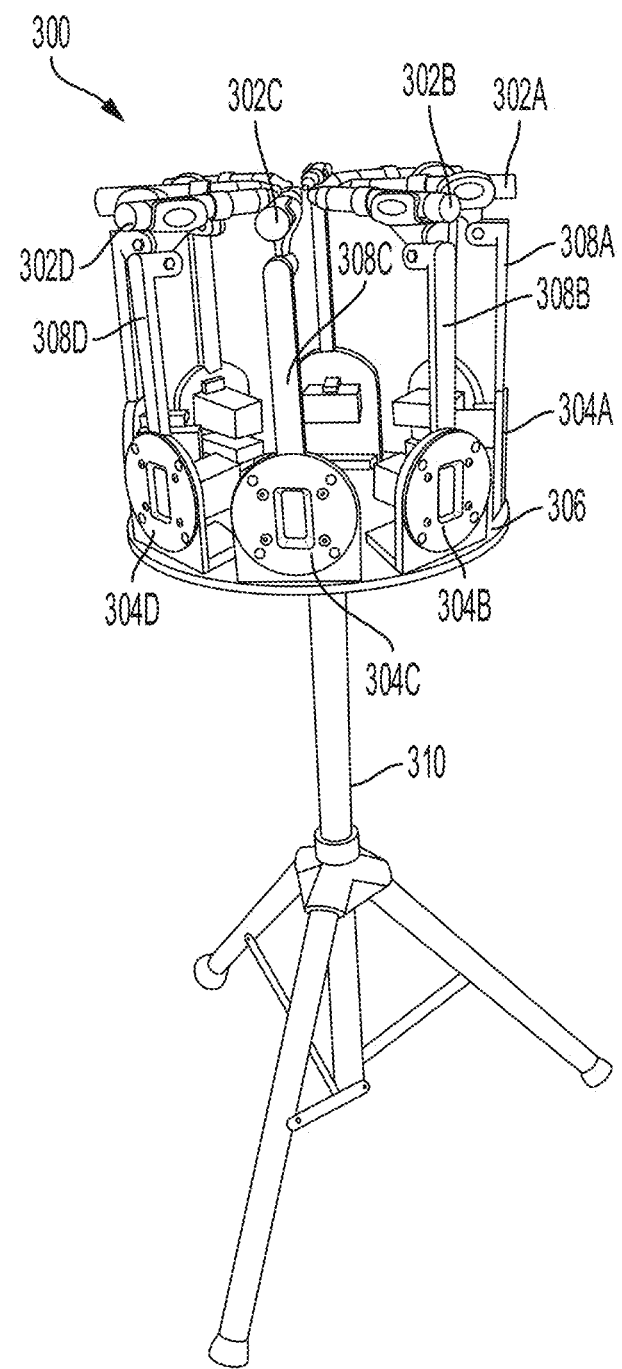

FIGS. 3A-3B illustrate a transmitter/receiver array 300 according to an exemplary embodiment of the present disclosure. The transmitter/receiver array 300 may be used to transmit and/or receive audio transmission 200. For example, the transmitter/receiver array 300 may be an exemplary implementation of at least one of the computing devices 102, 104. The transmitter/receiver array 300 includes eight receivers 302A-H and eight transmitters 304A-H. Each of the eight receivers 302A-H may be exemplary implementations of the receivers 110, 112. For example, the eight receivers 302A-H may be implemented as microphones. Each of the eight transmitters 304A-H may be exemplary implementations of the transmitters 106, 108. For example, the eight transmitters 304A-H may be implemented as speakers.

Figure 4:
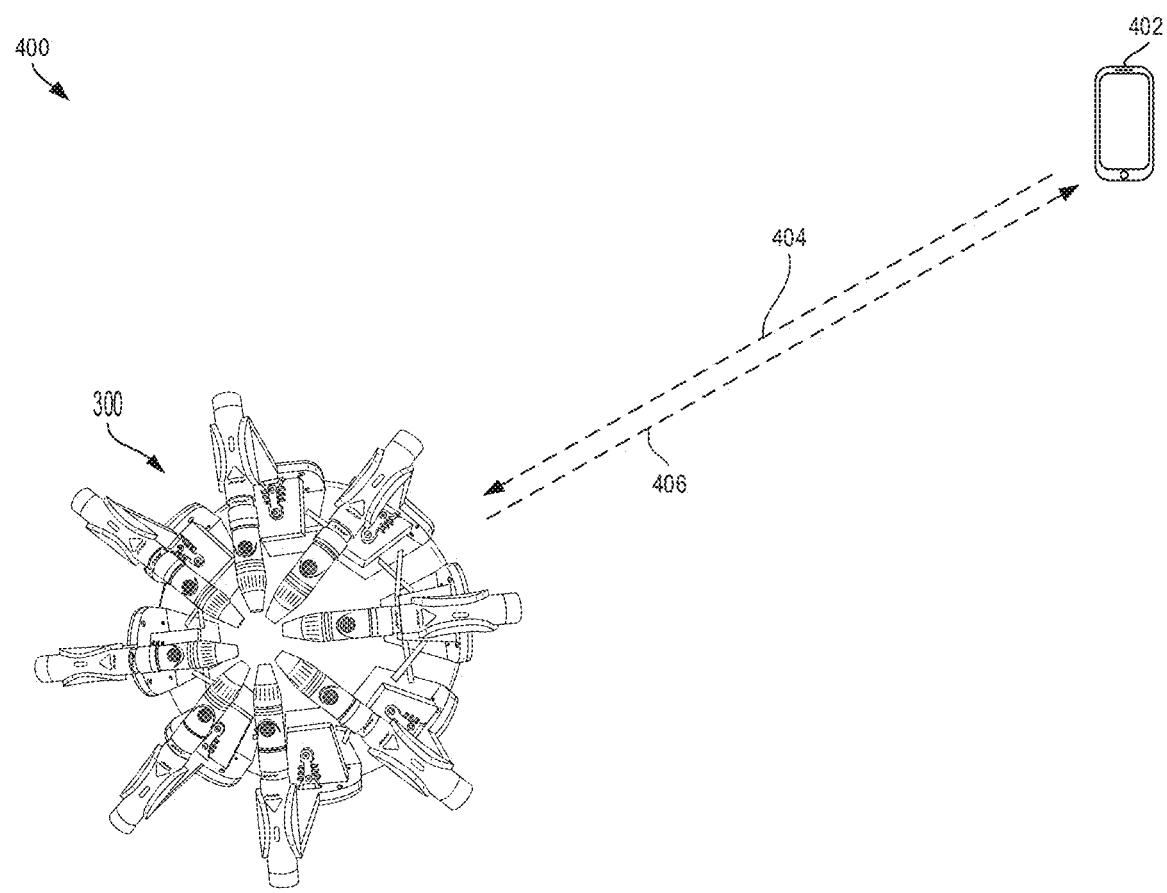
FIG. 4 illustrates a scenario according to an exemplary embodiment of the present disclosure.

As depicted, the receivers 302A-H and the transmitters 304A-H are arranged to evenly cover a 360° area surrounding the transmitter/receiver array 300. For example, the receivers 302A-H and transmitters 304A-H are arranged so that there is approximately 45° between adjacent receivers 302A-H and adjacent transmitters 304A-H. Such a configuration may enable the transmitter/receiver array 300 receive audio transmissions 200 from and transmit audio transmissions 200 in multiple directions within a coverage area of the transmitter/receiver array 300. The transmitter/receiver array 300 may be configured to receive and transmit audio transmissions from computing devices located within the coverage area of the transmitter/receiver array 300. For example, FIG. 4 illustrates a scenario 400 in which a computing device 402 (e.g., a mobile device) transmits audio transmissions 404 to the transmitter/receiver array 300 and receives audio transmissions 406 from the transmitter/receiver array 300.

Returning to FIGS. 3A-3B, the receivers 302A-H and the transmitters 304A-H may be mounted on a support body 306. The support body 306 may allow the transmitter/receiver array 300 to be positioned and configured without altering the relative orientation of the receivers 302A-H and the transmitters 304A-H. In certain implementations, the receivers 302A-H may be mounted such that the receivers 302A-H are separated from the transmitters 304A-H (e.g., so that the receivers 302A-H can avoid interference from the transmitters 304A-H). For example, the receivers 302A-H may be mounted on structural members 308A-D (only a subset of which are depicted in FIG. 3B) that separate the receivers 302A-H from the transmitters 304A-H. In certain implementations, the transmitter/receiver array 300 may be mounted on a support element, such as the support element 310. The support element 310 may raise the transmitter/receiver array 300 from the ground such that the transmitter/receiver array 300 is at a height better suited to receiving and transmitting audio transmission 200 (e.g., at or between chest and waist height for a typical individual).

It should be appreciated that additional or alternative implementations of the transmitter/receiver array 300 are possible. For example, alternative implementations may have more or fewer transmitters and/or receivers and/or may have larger or smaller transmitters and/or receivers. As another example, alternative implementations may omit one or more of the support body 306, the structural members 308A-D, and/or the support elements 310. As yet another example, alternative implementations may further include a housing surrounding the transmitters 304A-H and/or receivers 302A-H.

Figure 5A:
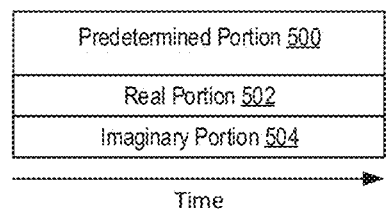
FIG. 5A illustrates a predetermined portion of an audio transmission according to an exemplary embodiment of the present disclosure.

FIG. 5A illustrates a predetermined portion 500 of an audio transmission according to an exemplary embodiment of the present disclosure. The predetermined portion 500 may represent a portion of an audio transmission that is generated to include an expected sequence of symbols. In certain implementations, the predetermined portion 500 may be included at the beginning of an audio transmission. For example, the predetermined portion 500 may be an exemplary implementation of the preamble 202 of the audio transmission 200. In additional or alternative implementations, the predetermined portion 500 may be included later within an audio transmission. For example, the predetermined portion 500 may occur in the middle of an audio transmission or at the end of an audio transmission. In still further implementations, the predetermined portion 500 may occur multiple times with an audio transmission. For example, the predetermined portion 500 may be included at the beginning of, in the middle of, and/or at the end of an audio transmission. In additional or alternative implementations, the predetermined portion 500 may be an exemplary implementation of an expected sequence used to generate a preamble or other predetermined portion of an audio transmission.

The predetermined portion 500 includes a real portion 502 and an imaginary portion 504. The real portion 502 may include the real values of the predetermined portion 500 and the imaginary portion 504 may include the imaginary values of the predetermined portion 500. In certain implementations, the real values included within the real portion 502 may represent a magnitude for samples of an audio signal containing the predetermined portion 500 (e.g., for one or more audio samples included within the predetermined portion 500). Additionally or alternatively, the imaginary values included within the imaginary portion 504 may represent an amount of phase shift for samples of an audio signal containing the predetermined portion 500. For example, the imaginary values may represent a phase delay at passband (e.g., when transmitted) after the predetermined portion 500 is modulated onto a carrier frequency of the audio transmission. Accordingly, the real portion 502 and the imaginary portion 504 may, in combination, form complex values.

As depicted, the predetermined portion 500 is a continuous signal with continuously-changing real values and imaginary values. In alternative implementations, the predetermined portion may include symbols containing the predetermined real values and imaginary values. For example, the predetermined portion 500 may include 2, 6, 8, or 16 symbols. In such implementations, each of the symbols may contain one or more complex values.

Additionally, as depicted, the predetermined portion 500 includes both a real portion 502 and an imaginary portion 504. For example, where the predetermined portion 500 is part of an audio transmission that is to be transmitted, the predetermined portion 500 may be generated to include both the real portion 502 and the imaginary portion 504. However, in certain implementations, the predetermined portion 500 may not include the imaginary portion 504. For example, audio transmissions may be transmitted as real-valued signals. In particular, the predetermined portion may be transmitted by taking the real portion 502 of the predetermined portion 500 (e.g., with the imaginary portion 504 acting as a delay). Accordingly, the predetermined portion 500 of a received audio transmission may lack the imaginary portion 504. In such instances, the real portion 502 of the predetermined portion 500 may be utilized, as explained further below.

Figure 5B:
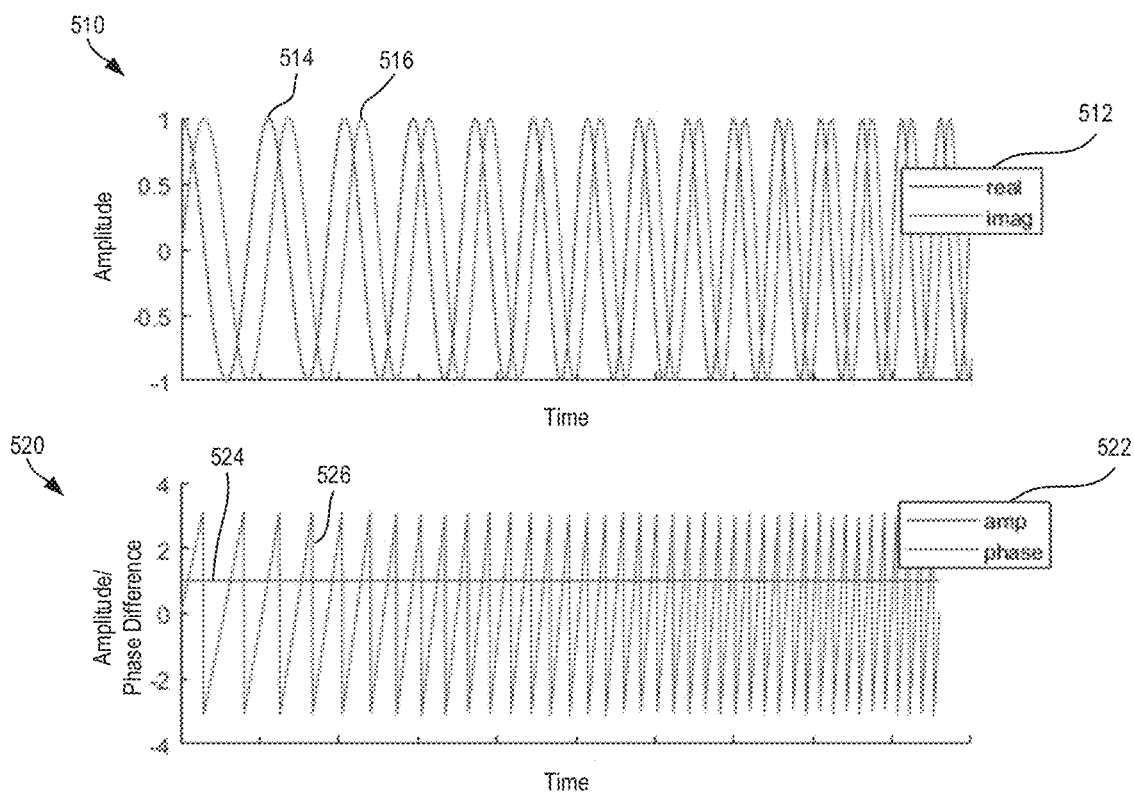
FIG. 5B illustrates plots of a real portion and an imaginary portion of a predetermined portion of an audio transmission according to an exemplary embodiment of the present disclosure.

FIG. 5B illustrates plots 510, 520 of a predetermined portion of an audio transmission according to an exemplary embodiment of the present disclosure. The plot 510 depicts the amplitude of the real and imaginary portions of the predetermined portion over time and the plot 520 depicts the amplitude and phase of the predetermined portion over time. As seen in the legend 512, the plot 510 includes a line 514 representing the amplitude of the real portion of the predetermined portion and a line 516 representing the amplitude of the imaginary portion of the predetermined portion. As seen with the lines 514, 516, the real and imaginary portions are out of sequence, with the imaginary portion peaking after the real portion. Furthermore, over time, the frequency of both the real portion and the imaginary portion increases, causing the lines 514, 516 to oscillate closer together at the end of the plot 510. Turning to the plot 520, as seen in the legend 522, the plot 520 includes a line 524 representing the amplitude of the predetermined portion over time and a line 526 representing the phase of the predetermined portion over time. As the line 524 demonstrates, the amplitude of the predetermined portion 500 remains at 1 throughout the plot 520, which is why both the real and imaginary portions oscillate between +1 and −1 within the plot 510. In the line 526, the phase of the predetermined portion increases from a minimum of −π radians to a maximum of +π radians between maximum and minimum peaks of the imaginary portion of the predetermined portion before returning to −π radians. Accordingly, the phase change cycle depicted in line 526 repeats twice for every cycle of the imaginary portion depicted in line 516. Therefore, as the frequency of the predetermined portion increases over time, the line 526 compresses closer together than the lines 514, 516 within the plot 520.

In the above examples, the predetermined portion is depicted and discussed as a continuous linear phase chirp signal. Specifically, the predetermined portion was generated as a signal s(n), where:

$$s(n) = e^{j2\pi\phi(n)}, \text{ with}$$

$$\phi(n) = \sum_{i=0:n} \frac{f(i)}{f_{start}}, \text{ and}$$

$$f(n) = f_{start} + n * \left( \frac{f_{end} - f_{start}}{N_{samples}} \right)$$

where:
ϕ(n) is the phase for sample n;
f(n) is the frequency for sample n;
$f_{start}$ is the starting frequency of the predetermined portion;
$f_{end}$ is the ending frequency of the predetermined portion; and
$N_{samples}$ is the total number of samples in the predetermined portion.

It should be understood that additional or alternative implementations of the predetermined portion may be possible. For example, the predetermined portion may include an increasing frequency over time (as depicted), a decreasing frequency over time, or both. Similarly, the predetermined portion may include phase change cycles that increase (as depicted), decrease, or both. In implementations where the predetermined portion is implemented as a series of symbols, each symbol may have a different type of signal with different frequency and/or phase change cycle characteristics. As a further example, the predetermined portion may be implemented as a complex single tone and/or as a phase-shift keying (PSK) signal.

Figure 6A:
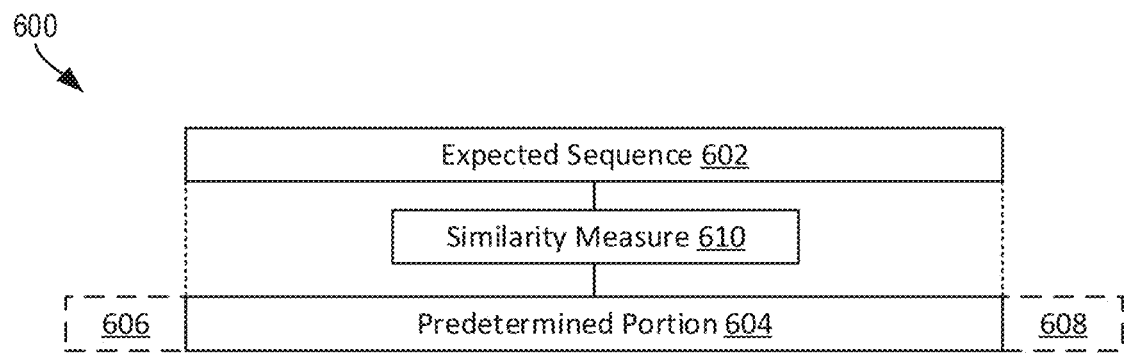
FIGS. 6A-6C illustrate comparisons of a received audio signal to an expected sequence according to an exemplary embodiment of the present disclosure.
Figure 6B:
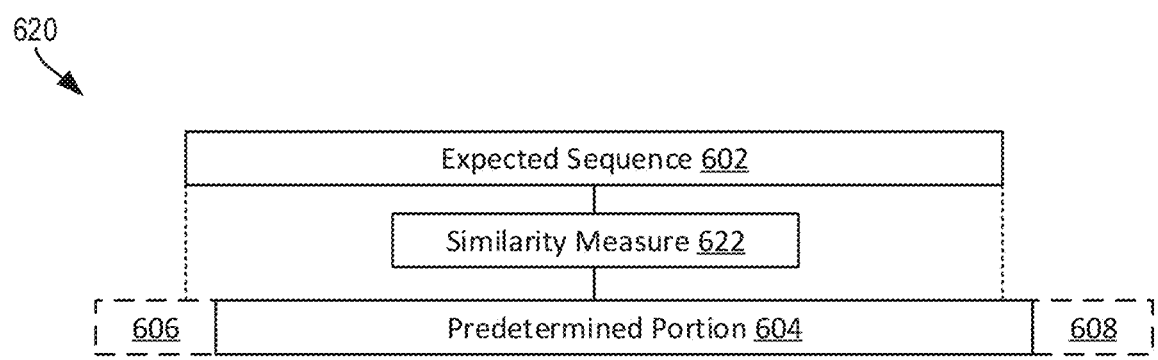
Figure 6C:
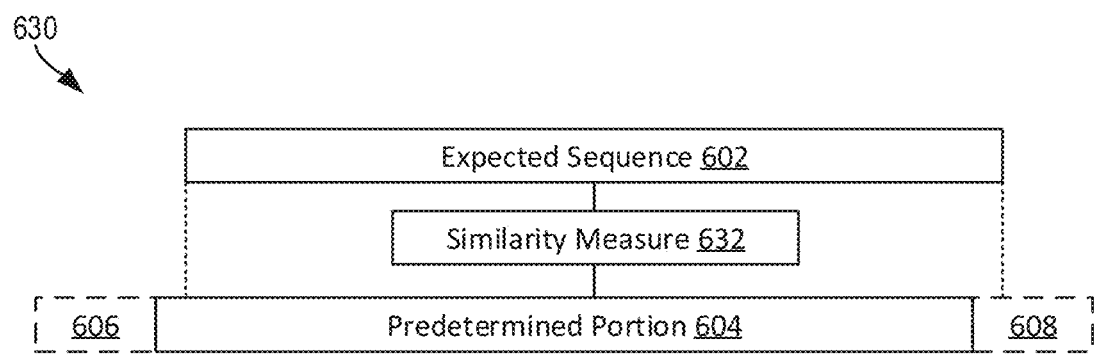

FIGS. 6A-6C illustrate comparisons 600, 620, 630 of a received audio signal to an expected sequence 602. The received audio signal includes a predetermined portion 604, which may be an exemplary implementation of any of the predetermined portions discussed in the present disclosure. The received audio signal also includes earlier audio data 606 and later audio data 608. The earlier audio data 606 may include audio signals received by a receiver before the predetermined portion 604. For example, and where the predetermined portion 604 indicates the beginning of an audio transmission, the earlier audio data 606 may include environmental sounds and/or interference unrelated to the predetermined portion 604 and unrelated to an audio transmission included within the received audio signal. Furthermore, received audio signals may contain only real values and may not contain imaginary values.

In the comparisons 600, 620, 630, the received audio signal is compared to an expected sequence 602. The expected sequence 602 may contain an imaginary portion and a real portion, similar to the predetermined portion 500 discussed above. In particular, the expected sequence 602 may contain a series of continuous complex values with which the predetermined portion 604 was initially transmitted (e.g., by another computing device to the computing device receiving the audio signal). The received audio signal may be compared to the expected sequence 602 by computing a similarity measure 610, 622, 632 between the expected sequence 602 and a corresponding portion of the received audio signal. In the comparison 600, the similarity measure 610 is computed between the expected sequence 602 and the predetermined portion 604. In the comparison 620, the similarity measure 622 is calculated between the expected sequence 602 and a portion of the earlier audio data 606 and the predetermined portion 604. In the comparison 630, the similarity measure 632 is calculated between the expected sequence 602 and a portion of the later audio data 608 and the predetermined portion 604.

The similarity measures 610, 622, 632 may be computed to measure the similarity between the complex values of the expected sequence 602 and the real values from the corresponding portion of the received audio signal. For example, the similarity measures 610, 622, 632 may be calculated as a correlation between the expected sequence 602 and the corresponding portion of the received audio signal. For example, and with reference to the signal s(n) of the predetermined portion 500 discussed above, the received audio signal y(n) may be received as:

$$y(n) = \text{Real}(x(n)*e^{-j\theta_{channel}}), \text{ with}$$

$$x(n) = \text{Real}(s(n))$$

where:

$\theta_{channel}$ is a phase delay caused by the audio channel through which the audio transmission was sent and received (e.g., the physical environment, the transmitter, and the receiver).

In such instances, the similarity measures, $y_{corr}(n)$, may be calculated as:

$$y_{corr}(n) = \text{conv}(y(n), s(n))$$

where:

conv( ) is a measure of the convolution between two signals.

Comparisons may be performed at multiple times to detect when an audio transmission is received. For example, comparisons may be performed on a continuous basis (e.g., at regular intervals) for audio signals received by a receiver, such as the receivers 302A-H. In particular, similarity values 610, 622, 632 may be calculated between the expected sequence 602 and the most recently received portion of the received audio signal that is the same length as the expected sequence 602 (e.g., a sliding window of the audio signal with the same length as the expected sequence 602). In practice, as depicted in the comparisons 620, 630, comparisons may be performed for audio signals received before and/or after the predetermined portion 604. Accordingly, the similarity measures 622, 632 may be lower than the similarity measure 610, indicating that the predetermined portion 604 is contained within the corresponding part of the received audio signal for the comparison 600.

Figure 6D:
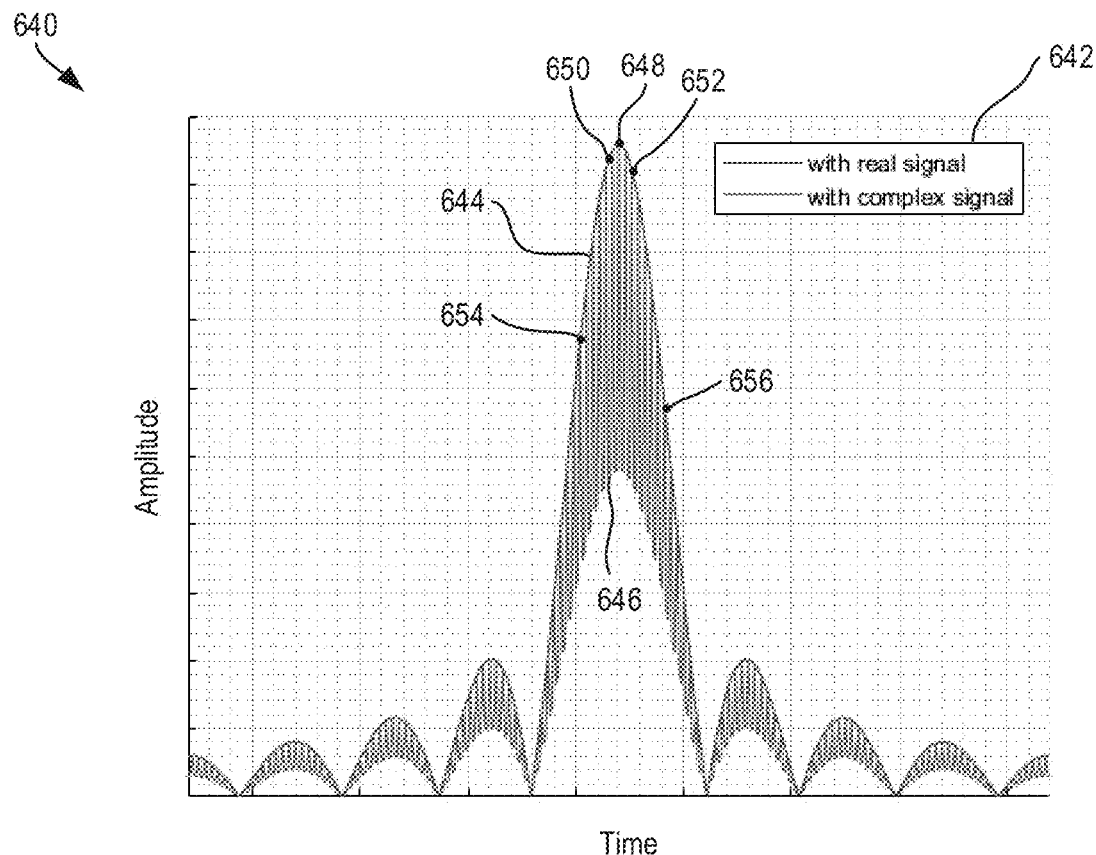
FIG. 6D illustrates a plot of similarity measures for different windows of a received audio signal according to an exemplary embodiment of the present disclosure.

As a further example, FIG. 6D depicts a plot 640 of similarity measures for different windows of a received audio signal. In particular, as indicated by the legend 642, the plot 640 includes a line 644 corresponding to a similarity measure using only real values of the expected sequence 602 and a line 646 corresponding to a similarity measure using complex values of the expected sequence 602. In particular, the lines 644, 646 depict similarity measures for sliding windows of a received audio signal starting at different times. As can be seen, the line 644 includes multiple peaks, with a maximum value at point 648. The line 646 follows a similar shape as the line 644, but with many more intervening peaks between the local maximum of the line 644 caused by the changes in phase reflected in and/or detected using the complex values.

In practice, the intervening peaks of similarity measures utilizing complex values enable greater time resolution, allowing for substantially improved determination of when an audio transmission is received and detected. However, computing similarity measures 610, 622, 632 using both real and imaginary values of the expected sequence 602 may require substantially more computing resources than computing similarity measures 610, 622, 632 using only real values of the expected sequence. Specifically, computing correlations between a received audio signal and both the real and imaginary portions of the expected sequence 602 may be more than twice as computationally expensive than computing correlations between the received audio signal and only the real portion of the expected sequence 602. Furthermore, to compute similarity measures for the real and imaginary portions of the expected sequence, both magnitude and phase of the received audio signal must be extracted, rather than just extracting magnitude when using only the real portion. Therefore, it may be impractical to compare the imaginary portion of the expected sequence to all incoming audio signals. In particular, solely performing comparisons of the imaginary portions may utilize too much processing power to enable a computing device to accurately receive and process audio signals from multiple receivers, such as the receivers 302A-H. As another example, where the computing device receiving the audio signal is a mobile computing device, solely performing comparisons of the imaginary portions may unduly impact battery life or responsiveness of the mobile computing device.

Therefore, the similarity measures calculated on a rolling basis may be initially calculated using real values (e.g., the similarity measures indicated by the line 644) of the expected sequence 602 to reduce overall computing resource utilization. In practice, therefore, because of the reduced time resolution of the line 644 and the real-valued similarity measures, an incorrect value may be identified as the maximum similarity value, resulting in an incorrect estimation of the arrival time for the audio transmission. For example, similarity measures may be calculated at regular time intervals (e.g., every 1 ms, 10 ms, 20 ms, or 50 ms) for incoming audio signals. In one specific example, two consecutive similarity measures may be represented by the points 654, 656 on the line 644. Because the point 654 has a larger similarity measure than the point 656, the point 654 may be used to identify the time of detection for the predetermined portion 604. However, the point 654 has a smaller similarity measure than the point 648, and using the point 654 may result in an incorrect time of detection for the predetermined portion 604, resulting in erroneous future processing of the audio transmission containing the predetermined portion 604. Such scenarios may be more likely when phase shifts (e.g., delays of that are smaller than the duration of a sample of the audio signals) are introduced to the audio signals. In such instances, the plot 640 may be adjusted such that peaks adjacent to the maximum peak at point 648 of the line 644 may be higher in magnitude, resulting in a further misidentification of the correct time of detection.

In certain implementations, after detecting a similarity measure that exceeds a predetermined threshold, such as at the point 654, more detailed processing may take place. For example, similarity measures may be computed for multiple samples before and after the point 654. Performing such analysis using similarity measures calculated based on real values of the expected sequence alone may be insufficient to most accurately identify when an audio transmission is detected. For example, similarity measures computed based on real values may be unable to accurately identify the start time of the predetermined portion 500 with accuracies of, e.g., less than 0.2 ms, 0.1 ms, 0.05 ms, 0.01 ms. As a specific example, the points 650, 652 may correspond to similarity values for sliding windows beginning on consecutive samples of the received audio signal. Because the similarity measure at point 650 is larger than the similarity measure at point 652, the point 652 may be identified as the point with the highest similarity measure. However, the point 650 still has a lower similarity measure than the point 648, resulting in a less accurate detection time for the predetermined portion 604. For example, the points 648, 650 may be more than 0.05 ms apart. In certain implementations, e.g., for high-bandwidth audio transmissions, for audio transmissions received over long distances, for audio transmissions received in a noisy environment, and/or for distinguishing between multiple received audio transmissions, accuracies of 0.05 ms or less may be necessary to ensure accurate subsequent processing of received audio transmissions.

Therefore, similarity measures using complex values (e.g., real values and imaginary values) of the expected sequence 602 may also be analyzed. For example, similarity measures may be calculated for windows beginning or ending with samples before and after the point 654 (e.g., for a range of windows beginning or ending with consecutive samples before and after the point 654). In particular, similarity measures may be calculated within a predetermined threshold time difference (e.g., a predetermined amount of time and/or a predetermined number of samples before and/or after the point 654). For example, similarity measures may be calculated for windows beginning with samples that occur within 15 samples before or after the point 654. As another example, similarity measures may be calculated for windows beginning within 1 ms (or 0.5 ms) before or after the point 654. The similarity measures may be calculated between complex values of the expected sequence and the real values of the received audio signal using the convolution formulation discussed above. In practice, because of the faster changes to the phase of the audio signal (e.g., as indicated by the line 526) and corresponding improved time resolution in the line 646, utilizing complex values may enable more precise detection of where the largest similarity measure occurs. Specifically, by utilizing information regarding the phase, similarity measures calculated based on complex values may allow for sub-sample resolution (e.g., the detection of maximum similarity measures that occur between samples of the audio signal), which can help detect an accurate arrival time even with sub-sample phase shifts are introduced to the audio signal. Accordingly, in the above-discussed scenario where the points 648, 652 represent consecutive samples, similarity measures calculated based on the complex values of the expected sequence 602 may result in calculating a similarity measure at or near the point 648, even though the point 648 occurs between two samples. By detecting this sub-sample occurrence of a similarity measure, the accuracy of detection for when the predetermined portion 604 was received may be improved. Such implementations may therefore enable the 0.05 ms or less accuracies that may be required to accurately process audio transmissions in certain instances.

The above-discussed techniques combine the processing benefits of the real portion comparisons with the accuracy benefits of the imaginary portion comparisons. Specifically, by relying primarily on the comparisons of the real portions of received audio signals to initially detect the predetermined portion of an audio transmission and performing further comparisons of the imaginary portions to more accurately identify precisely when the audio transmission is received, the above-discussed techniques reduce the overall computing resources required as compared to utilizing only similarity measures calculated based on complex values of the expected sequence while also enabling the improved precision that the similarity measures provide once a predetermined portion 604 has been detected. Therefore, these techniques may enable improved precision of audio transmission detection while also imposing negligible impacts on overall device processing power and battery life.

In FIGS. 5A-5B and 6A-6D, the examples discussed utilized expected sequences and predetermined portions that were continuous signals. However, in certain instances, the expected sequences and predetermined portions may be implemented using discrete symbols (e.g., 2, 6, 8, or 16 symbols) within the audio transmission. In certain implementations, expected sequences and predetermined portions implemented using discrete symbols may be shorter in duration (e.g., 2 symbols/4 ms, 5 symbols/10 ms) than continuous signals (e.g., 40 ms). In implementations using discrete symbols, similarity measures may be calculated for each symbol individually (e.g., each symbol within the expected sequence) and may be combined to form a single similarity measure overall.

Figure 7A:
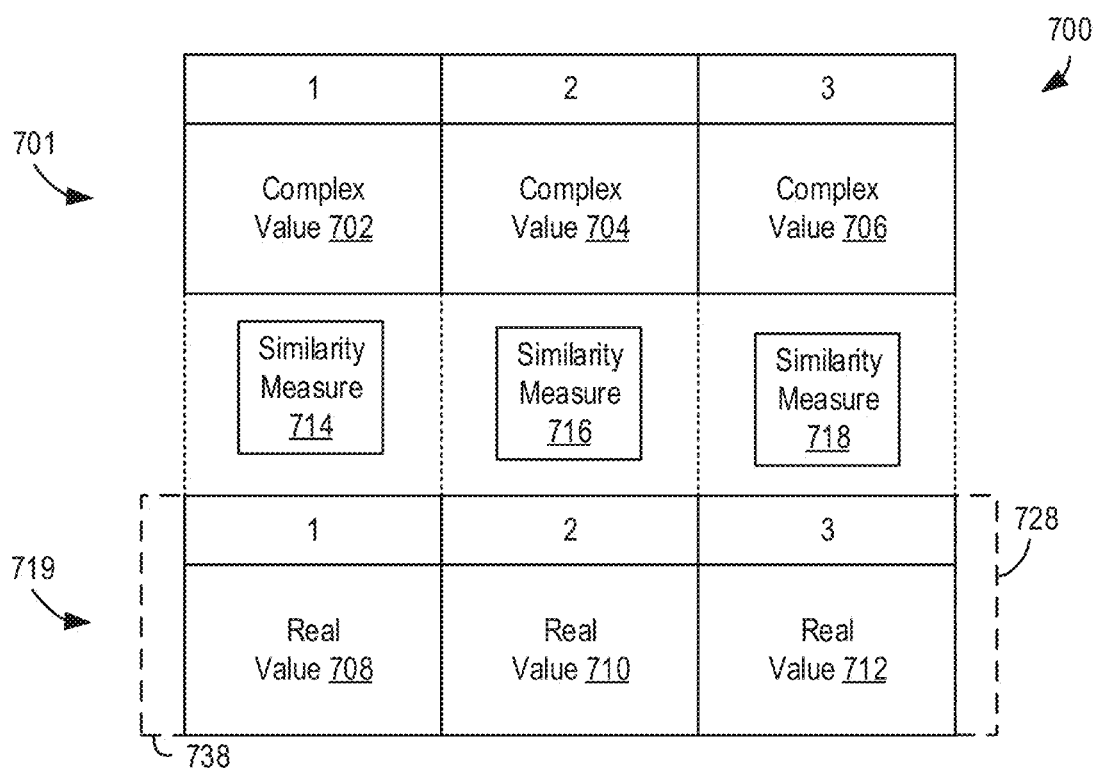
FIGS. 7A-7C illustrate a comparison of complex values of an expected sequence to a received audio signal according to an exemplary embodiment of the present disclosure
Figure 7B:
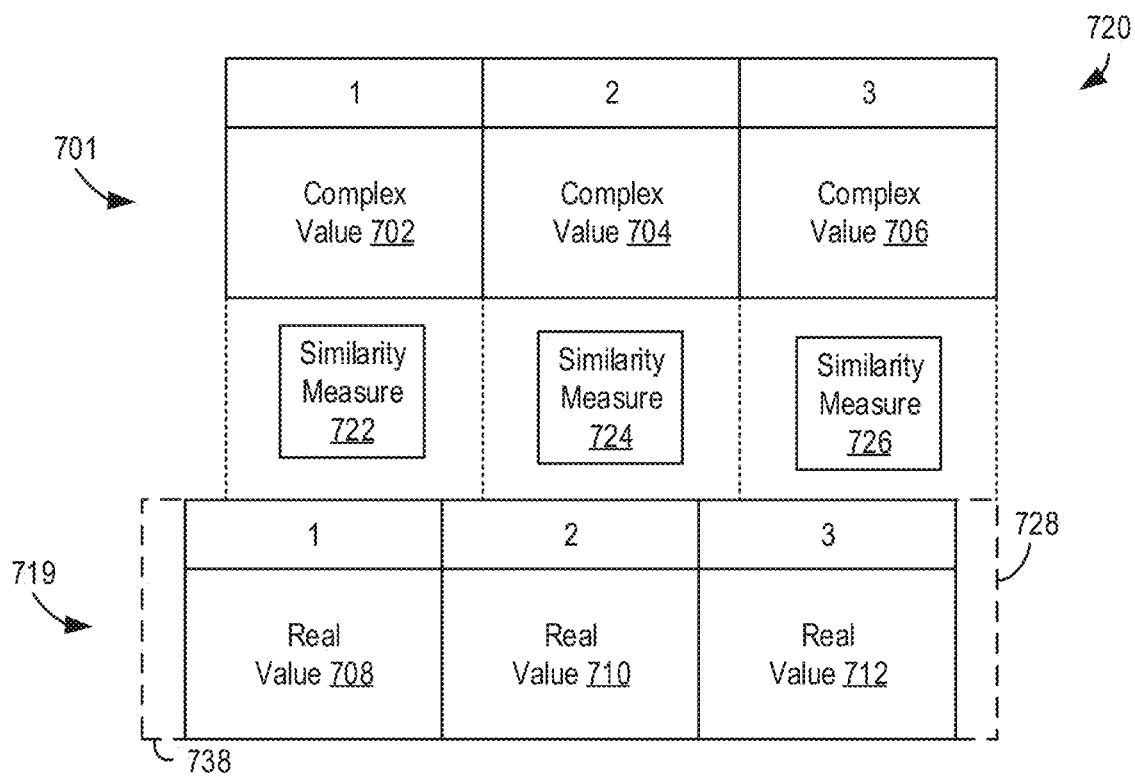
Figure 7C:
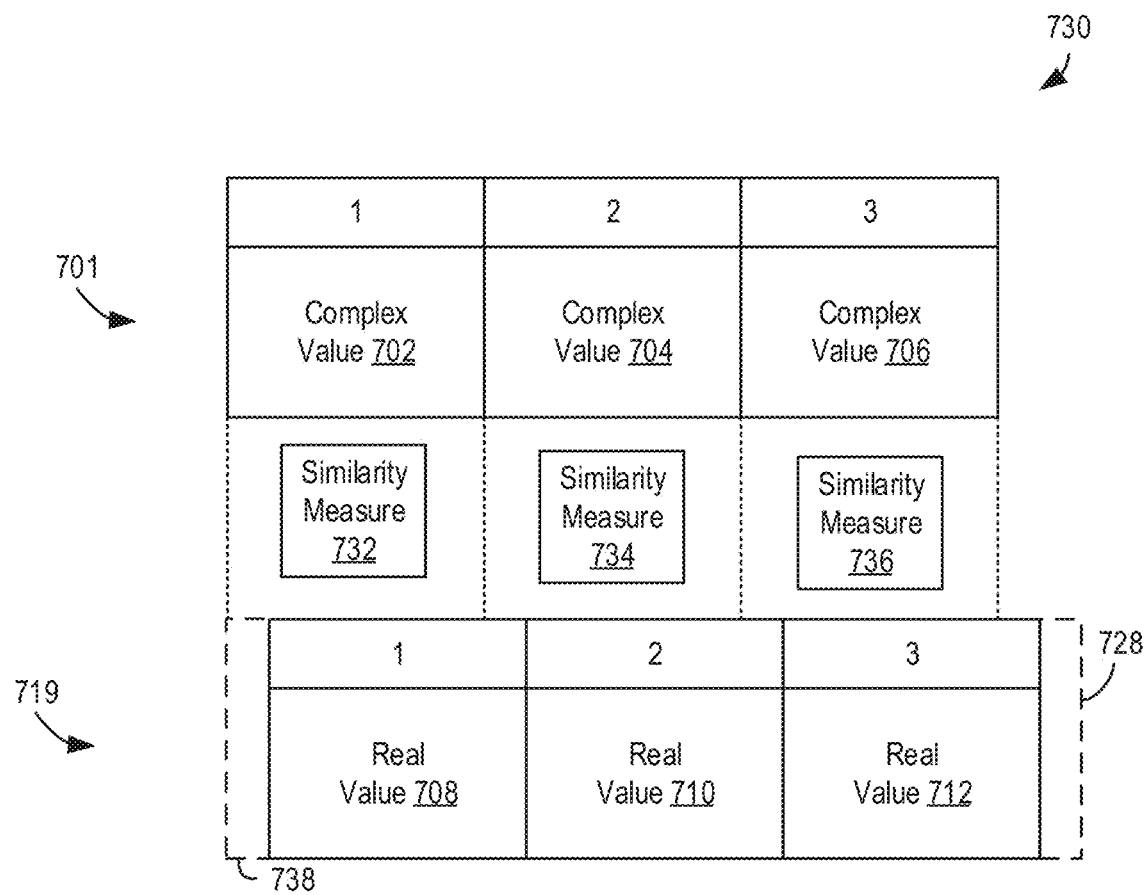

For example, FIGS. 7A-7C illustrate comparisons 700, 720, 730 of complex values 702, 704, 706 of an expected sequence 701 to a received audio signal 719 according to an exemplary embodiment of the present disclosure. The expected sequence 701 includes symbols 1-3, which contain the complex values 702, 704, 706. The complex values 702, 704, 706 may include one or more real- and imaginary-valued audio signals, similar to the real portion 502 and the imaginary portion 504 of the predetermined portion 500. The received audio signal 719 includes symbols 1-3 containing real values 708, 710, 712. For example, the symbols 1-3 may correspond to the symbols 1-3 of the expected sequence 701. The real values 708, 710, 712 contained within the symbols 1-3 may contain one or more real-valued audio signals. Similar to the received audio signal 719 in the comparisons 600, 620, 630, the received audio signal 719 includes earlier audio data 738 and later audio data 728, which may include, e.g., environmental audio data, audio data corresponding to additional symbols within the a predetermined portion of the received audio signal 719, and/or audio data corresponding to earlier or later portions of the audio transmission.

Turning to FIG. 7A, in the comparison 700, similarity measures 714, 716, 718 are calculated between the expected sequence 701 and the audio signal 719. In particular, the comparison 700 is performed at a time when the symbols 1-3 of the audio signal 719 align with the symbols 1-3 of the expected sequence 602. Therefore, the similarity measure 714 is calculated between the complex value 702 of symbol 1 of the expected sequence 602 and the real value 708 of symbol 1 of the audio signal 719. Similarly, the similarity measure 716 is calculated between the complex value 704 of symbol 2 of the expected sequence 602 and the real value 710 of symbol 2 of the audio signal 719. Further, the similarity measure 718 is calculated between the complex value 706 of symbol 3 of the expected sequence 602 and the real value 712 of symbol 3 of the audio signal 719. The similarity measures 714, 716, 718 may be calculated to determine how closely the complex values of the expected sequence 701 and the real values 708, 710, 712 of the audio signal 719 resemble one another. For example, the similarity measures 714, 716, 718 may be calculated as a correlation (e.g., a convolution measure) between the values that are compared, as discussed above. The similarity measures 714, 716, 718 may be combined into a combined similarity measure between the expected sequence 602 and the audio signal 719.

Comparisons similar to the comparison 700 may be performed at different starting times for the compared audio signal. For example, in the comparison 720, a later portion of the audio signal 719 is compared to the expected sequence. In particular, the later portion of the audio signal 719 includes the later audio data 728. Because the later portion is compared, the similarity measures 722, 724, 726 computed during the comparison may not correctly align between the symbols 1-3 of the expected sequence 701 and the audio sequence 729. In particular, the similarity measure 722 is computed between the complex value 702 of the expected sequence 602 and portions of the real values 708, 710; the similarity measure 724 is computed between the complex value 704 and portions of the real values 710, 712; and the similarity measure 726 is computed between the complex value 706, the real value 712, and the later audio data 728. The similarity measures 722, 724, 726 may be computed similarly to the similarity measures 714, 716, 718 and may similarly combined to generate a combined similarity measure for the comparison 720.

Based on the improper alignment of the symbols, the similarity measures 722, 724, 726 may be lower than the similarity measures 714, 716, 718 because non-corresponding symbols are being compared and may therefore differ more. In particular, the real values 708, 710, 712 may differ from the complex values 702, 704, 706 of the expected sequence 701 after being transmitted (e.g., due to interference or other distortions). However, the differences in the comparison 700 may be smaller than the differences between the misaligned symbols 1-3 of the audio signal 719 because portions of real values 710, 712 that occur later and later audio data 728 that do not correspond to the correct symbols 1-3 of the expected sequence 701 are being compared to the imaginary values 702, 704, 706. Therefore, because the audio signal 719 is improperly aligned with the expected sequence 602 in the comparison 720, the combined similarity measure for the comparison 720 may be lower than the combined similarity measure for the comparison 700.

As another example, in the comparison 730, the expected sequence 602 is compared to an earlier portion of the audio signal 719 that includes the earlier audio data 738 that occurs before the symbols 1-3. Similar to the later audio data 728, the earlier audio data 738 may cause the symbols 1-3 of the audio signal 719 to improperly align with the symbols 1-3 of the expected sequence 701 when calculating the corresponding similarity measures 732, 734, 736. In particular, the similarity measure 732 is calculated between the complex value 702, the earlier audio data 738 and a portion of the real value 708; the similarity measure 734 is calculated between the complex value 704 and portions of the real values 708, 710; and the similarity measure 736 is calculated between the complex value 706 and portions of the real values 710, 712. The similarity measures 732, 734, 736 may be calculated using techniques comparable to those used to calculate the similarity measures 714, 716, 718 and may be combined to generate a combined similarity score for the comparison 730. As explained above, because the symbols 1-3 of the audio signal 719 do not align with the symbols 1-3 of the expected sequence 602, the similarity measures 732, 734, 736 may be lower than the similarity measures 714, 716, 718 and therefore the combined similarity measure for the comparison 730 may be lower than the combined similarity measure for the comparison 700.

Although only three comparisons 700, 720, 730 are depicted and discussed above, in practice, additional or fewer comparisons may be performed. For example, as discussed above, the comparisons may be repeated for a predetermined period of time before and/or after the initial estimate of the starting time of the predetermined portion. As a specific example, the comparisons may be repeated at an initial estimate of the arrival time (e.g., based on a comparison of the real values of the expected sequence 701 with the real values 708, 710, 712 of the received audio signal 719), at ten different times before the initial estimate, and at ten different times after the initial estimate. In alternative implementations, the comparisons may be repeated five, 20, or 50 times before and/or after an initial estimate of the arrival time. The comparisons may be repeated at regular time intervals (e.g., every 0.02 ms, every 0.05 ms, every 0.1 ms) before and/or after the initial estimate. Additionally or alternatively, the comparisons may be repeated to begin with particular audio samples (e.g., each of the predetermined number before and/or after the initial estimate, every second or third sample before and/or after the initial estimate). In this way, the comparisons 700, 720, 730 of the imaginary portions of the expected sequence and a received audio signal may be more granular and precise than comparisons of the real portions.

As explained above, comparing the imaginary portions may allow for more accurate similarity measures that are capable of determining differences in alignment of the symbols 1-3 for smaller time differences than comparing the real portions. Accordingly, the comparisons 700, 720, 730 may be performed after multiple comparisons using real values of the expected sequence 701 are performed to initially estimate an arrival time of an audio transmission. For example, after an initial estimate of the starting time of the predetermined portion is determined based on comparisons of the real values of an audio signal containing the audio transmission, comparisons 700, 720, 730 may be performed for a smaller range of times surrounding the initial estimate of the starting time, similar to the comparisons 600, 620, 630 discussed above.

Figure 8:
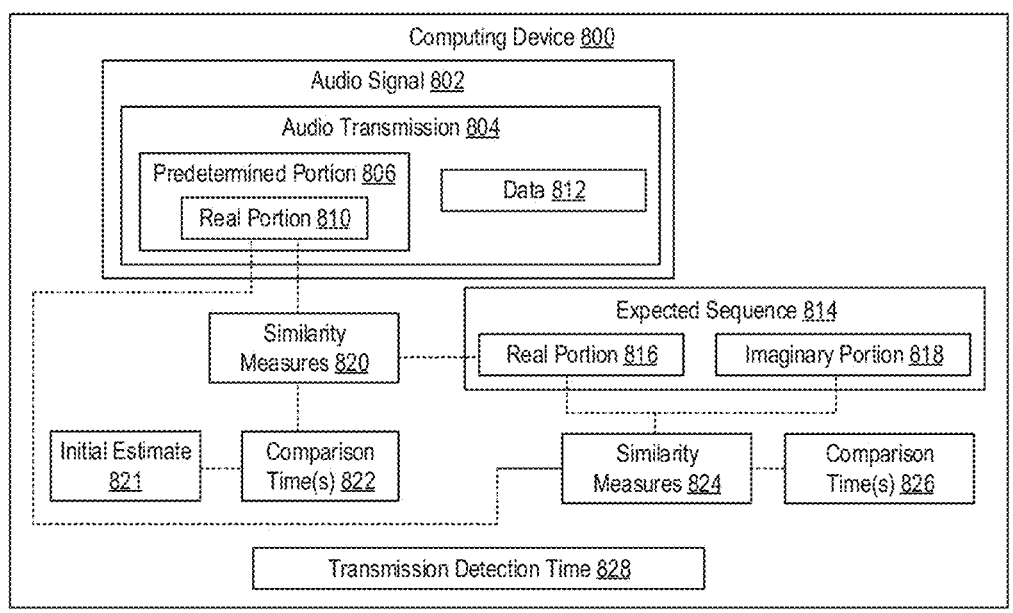
FIG. 8 illustrates a computing device according to an exemplary embodiment of the present disclosure.

FIG. 8 illustrates a computing device 800 according to an exemplary embodiment of the present disclosure. The computing device 800 may be an exemplary implementation of one of the computing devices 102, 104. In particular, the computing device 800 may be configured to receive and process audio signals to detect when an audio signal contains an audio transmission and to precisely determine when the audio transmission begins within the signal. For example, the computing device 800 may be configured to perform one or more of the comparisons 600, 620, 630, 700, 720, 730 discussed above.

The computing device 800 includes an audio signal 802, an expected sequence 814, similarity measures 820, 824, comparison times 822, 826, and a transmission detection time 828. The audio signal 802 may be received from a receiver, such as one of the receivers 302A-H. In certain implementations, the computing device 800 may receive multiple audio signals from multiple receivers and the audio signal 802 may be an exemplary implementation of one of the audio signals. The audio signal 802 may contain an audio transmission 804, and the computing device 800 may be configured to detect the audio transmission 804 within the audio signal 802. For example, the computing device 800 may continuously receive the audio signal 802 from a receiver, but the audio signal 802 may only occasionally include audio transmissions 804 received from other computing devices. The computing device 800 may therefore be configured to detect when the audio signal 802 includes an audio transmission 804 (e.g., in order to synchronize further processing of the audio transmission 804 with the correct portion of the audio signal 802).

The audio transmission 804 contains a predetermined portion 806 and data 812. The data 812 may be data intended for transmission with the audio transmission 804 and may be stored within a payload of the audio transmission 804. The predetermined portion 806 may be a portion of the audio transmission 804 that was generated to include a known or predetermined sequence of symbols, as discussed above. In particular, the predetermined portion 806 may include a real portion 810 containing real-valued signals.

The predetermined portion 806 may correspond to the expected sequence 814. In particular, the predetermined portion 806 may be initially generated and transmitted based on the same or similar symbols as the expected sequence 814. For example, the expected sequence 814 includes both a real portion 816 and an imaginary portion 818. The predetermined portion 806 may be generated, prior to transmission, to include symbols that have the same real portion 816 as the expected sequence 814 and to have phase delays based on the imaginary portion 818.

However, after the audio transmission 804 is transmitted from the other computing device and received by the computing device 800, the predetermined portion 806 may differ from the expected sequence 814 (e.g., due to channel delay, interference, and/or distortion). Therefore, the real portion 810 may differ from the real portion 816 and/or may have been phase shifted (e.g., by the audio channel), causing differences between the predetermined portion 806 and the imaginary portion 818. It may therefore be necessary to compare the predetermined portion 806 to the expected sequence 814 to determine when the predetermined portion 806 occurs within the audio transmission 804 and, by extension, to determine the transmission detection time 828 indicating when the audio transmission 804 begins within the audio signal 802.

The computing device 800 may initially compare the real portions 810, 816 of the predetermined portion and the expected sequence 814 to determine the transmission detection time 828. Specifically, the computing device 800 may compare the real portions 810, 816 to determine an initial estimate 821 of the transmission detection time 828. For example, the computing device 800 may calculate one or more similarity measures 820 between the real portions 810, 816 at one or more comparison times 822. As a specific example, the computing device 800 may calculate the similarity measures 820 as one or more correlation measures (e.g., convolutions) between the real portions 810, 816 at different comparison times 822. In particular, the computing device 800 may generate similarity measures 820 between the real portion 816 of the expected sequence 814 and a real portion (e.g., real values) of the audio signal 802 at regular intervals. The similarity measures 820 may include similarity measures for individual symbols within the real portion 816 and/or combined similarity measures that correspond to individual comparison times 822, as discussed above. In certain instances, the comparison times 822 may correspond to a particular time stamp for a window (e.g., a sliding window) of the audio signal 802 that is compared to the expected sequence 814. For example, the comparison times 822 may represent a starting timestamp for the window, an ending timestamp for the window, a middle timestamp for the window, or any other timestamp for the window.

The computing device 800 may initially detect the audio transmission 804 based on the comparisons of the real portions 810, 816. For example, where the computing device 800 compares the real portion 816 of the expected sequence 814 to the audio signal 802 at regular intervals, the computing device 800 may detect the audio transmission 804 when at least one of the similarity measures 820 exceeds a predetermined threshold. Upon detecting the audio transmission 804, the computing device 800 may determine an initial estimate 821 of the time of arrival for the starting time of the predetermined portion 806 within the audio signal 802. For example, the initial estimate 821 of the time of arrival may be determined for the first comparison time 822 at which a corresponding similarity measure 820 (e.g., a combined similarity measure) exceeds the predetermined threshold. In additional or alternative implementations, the computing device 800 may continue to compute similarity measures after (e.g., for a predetermined period of time after) a similarity measure 820 exceeds the predetermined threshold. The computing device 800 may, in such implementations, determine the initial estimate 821 to be the comparison time 822 corresponding to the largest similarity measure 820.

The computing device 800 may also compare the real portion 806 to both the real portion 816 and the imaginary portion 818 of the expected sequence 814 to determine the transmission detection time 828. For example, the computing device 800 may compute one or more similarity measures 824 between the real portion 806 and both the real portion 816 and the imaginary portion 818 at one or more comparison times 826. As a specific example, the computing device 800 may perform one or more of the comparisons 600, 620, 630, 700, 720, 730. Similar to the comparison times 822, the comparison times 826 may correspond to a particular time stamp for a window (e.g., a sliding window) of the audio signal 802 that is compared to the expected sequence 814. For example, the comparison times 826 may represent a starting timestamp for the window, an ending timestamp for the window, a middle timestamp for the window, or any other timestamp for the window. In certain instances, the computing device 800 may compute the similarity measures 824 at comparison times 826 selected based on the initial estimate 821. For example, and as discussed above, the comparison times 826 may be selected to occur within a predetermined threshold time difference of the initial estimate 821 (e.g., to include a predetermined period of time and/or predetermined number of audio samples before and/or after the initial estimate 821 of the arrival time). The comparison times 826 may therefore cover a smaller range of times than the comparison times 822. Where the expected sequence 814 is a continuous signal (e.g., similar to the expected sequence 602), the similarity measures 824 may be calculated for the signal as a whole, as discussed above in connection with the comparisons 600, 620, 630. Where the expected sequence 814 includes one or more symbols (e.g., similar to the expected sequence 701), the similarity measures 824 may include similarity measures for individual symbols within the imaginary portion 818 and/or combined similarity measures that correspond to individual comparison times 826, as discussed above in connection with the comparisons 700, 720, 730.

The transmission detection time 828 may be selected based on the similarity measures 824. For example, the transmission detection time 828 may be selected as the detection time 826 with the largest corresponding similarity measure 824. As explained above, comparing both the real portion 816 and the imaginary portion 818 of the expected sequence 814 to the real portion 810 of the predetermined portion 806 enables a more precise detection of when the predetermined portion 806 of the audio signal 802 most closely resembles the expected sequence 814 and, by extension, when the audio transmission 804 arrived. As also explained above, only performing comparisons utilizing both the real portion 816 and the imaginary portion 818 of the expected sequence 814 may be computationally expensive, so balancing such comparisons with comparison of the real portions 810, 816 may enable the more precise detection of the arrival of the audio transmission 804 without unduly increasing the computational resource requirements.

In certain implementations, the transmission detection time 828 may be determined to be the time at which the predetermined portion 806 begins within the audio signal 802. For example, the comparison times 826 may indicate the starting time of a portion of the audio signal that is compared to the imaginary portion 818 and the transmission detection time 828 may be selected to identify the starting time that corresponds to the largest similarity measure 824. Additionally or alternatively, the transmission detection time 828 may be determined to be the time at which the audio transmission 804 begins. For example, if the predetermined portion 806 does not occur at the beginning of the audio transmission 804, the computing device 800 may adjust the starting time indicated by the comparison time 826 to indicate the beginning time of the audio transmission 804. In particular, the predetermined portion 806 may occur at a particular time difference (e.g., a particular duration of time and/or number of symbols) after the beginning of the audio transmission 804. The starting time indicated by the comparison time 826 corresponding to the highest similarity measure 824 may therefore be adjusted by subtracting the particular time difference in order to indicate the beginning time of the audio transmission 804. In additional or alternative implementations, the transmission detection time 828 may be determined to be a time at which a different portion of the audio transmission 804 begins. For example, the transmission detection time 828 may be selected to indicate when the portion of the audio transmission 804 storing the data 812 begins. In such instances, techniques similar to those discussed above may be used to adjust the starting time indicated by the comparison time 826 to identify the beginning time of the data 812 within the audio transmission 804.

Once the transmission detection time 828 is detected, the audio transmission 804 may be extracted from the audio signal 802 for further processing. For example, the computing device 800 may extract a predetermined length of the audio signal 802 corresponding to all or part of the audio transmission 804 and may use the extracted portion of the audio signal 802 in further processing of the audio transmission 804.

It should be understood that any of the times discussed herein (e.g., comparison times, transmission detection times, initial estimates of the time of arrival of an audio transmission) may include times stored and/or computed as absolute times (e.g., a particular time and date), relative times (e.g., time since a predetermined fixed point, such as the beginning of the hour, week, day), and an audio sample count (e.g., a numerical identifier of a particular audio sample corresponding to the relevant point in time). In certain implementations, the similarity measures discussed herein may be calculated as difference measures (e.g., a measure of differences between audio signals instead of a measure of similarity). In such implementations, any of the embodiments discussed herein that include determining when a similarity exceeds a predetermined threshold may be implemented by determining when a difference measure falls below a predetermined threshold. Further, any of the embodiment discussed herein that include identifying and/or selecting a time corresponding to a largest similarity measure may be implemented by identifying and/or selecting a time corresponding to a smallest difference measure.

Figure 9:
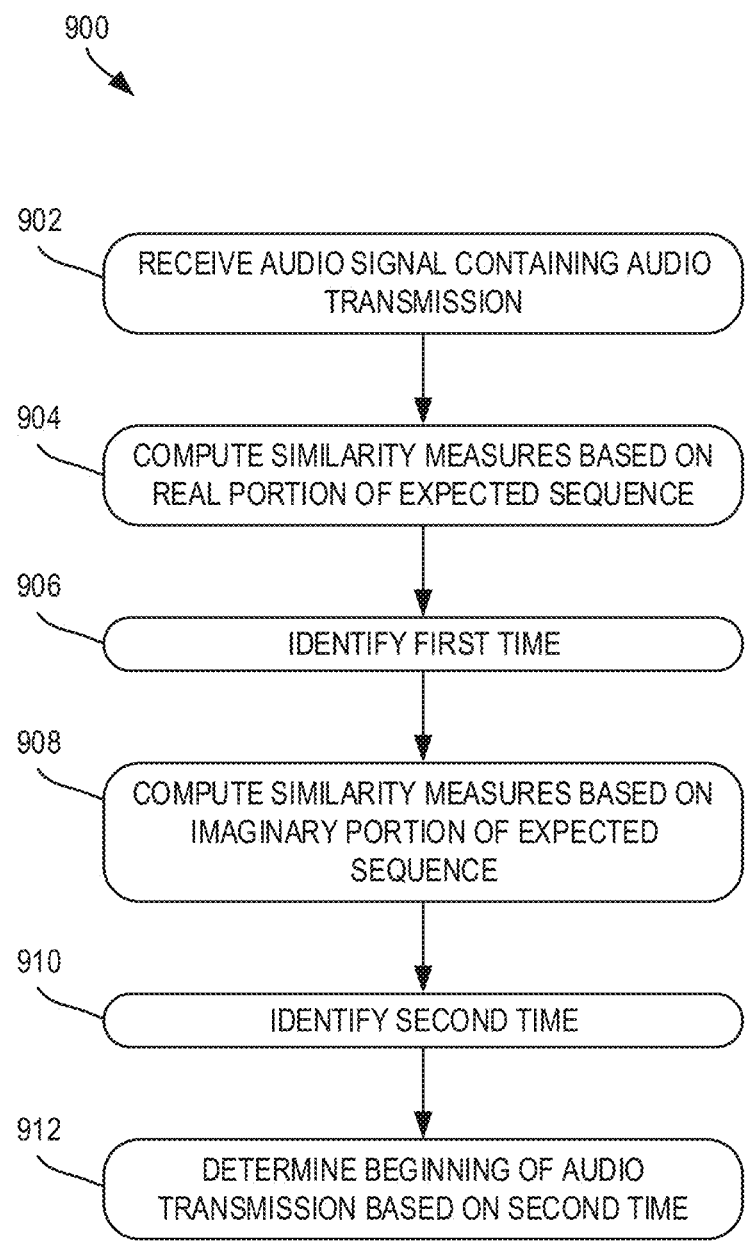
FIG. 9 illustrates a method according to an exemplary embodiment of the present disclosure.

FIG. 9 illustrates a method 900 according to an exemplary embodiment of the present disclosure. The method 900 may be performed to determine the arrival time of an audio transmission within an audio signal. The method 900 may be implemented on a computer system, such as the computing device 800. The method 900 may also be implemented by a set of instructions stored on a computer readable medium that, when executed by a processor, cause the computer system to perform the method 900. For example, all or part of the method 900 may be implemented by a processor and a memory of the computing device 800. Although the examples below are described with reference to the flowchart illustrated in FIG. 9, many other methods of performing the acts associated with FIG. 9 may be used. For example, the order of some of the blocks may be changed, certain blocks may be combined with other blocks, one or more of the blocks may be repeated, and some of the blocks described may be optional.

The method 900 begins with receiving an audio signal containing an audio transmission (block 902). For example, the computing device 800 may receive an audio signal 802 containing audio transmission 804. The audio transmission 804 may include a predetermined portion 806 initially generated to be identical to an expected sequence 814. The transmission 804 may additionally include data 812 for transmission using the audio transmission 804.

Similarity measures may be computed based on a real portion of an expected sequence (block 904). For example, the computing device 800 may compute similarity measures 820 between a real portion 816 of the expected sequence 814 and a real portion of the audio signal 802. In particular, the similarity measures 820 may be computed at multiple comparison times 822 (e.g., at regular intervals based on the received audio signal 802) in order to initially detect the audio transmission 804. A first time may then be identified (block 906). For example, a first time indicating an initial estimate 821 of an arrival time of the audio transmission 804 may be identified. In particular, in certain instances, the first time may be identified based on the similarity measures 820 between the real portions 810, 816. For example, the first time may be identified as the first comparison time 822 that corresponds to a similarity measure 820 that exceeds a predetermined threshold and/or may be identified as the comparison time 822 corresponding to the largest similarity measure 820, as discussed above.

Similarity measures may be computed based on an imaginary portion of the expected sequence (block 908). For example, the computing device 800 may compute similarity measures 824 based on the imaginary portion 818 of the expected sequence 814. For example, the similarity measures 824 may be computed to indicate a similarity of the real portion 810 of the predetermined portion 806 to both the real portion 816 and the imaginary portion 818 of the expected sequence 814. The similarity measures 824 may be computed at one or more comparison times 826. The comparison times 826 may be selected based on the first time identified at block 906. For example, the comparison times 826 for which similarity measures 824 are computed may be selected to include one or more of a predetermined range of times and/or a predetermined range of audio samples before and/or after the first time identified at block 906. A second time may then be identified (block 910). For example, the second time may be identified based on the similarity measures 824. As a specific example, the second time may be identified to indicate the comparison time 826 that corresponds to the largest similarity measure 824.

The beginning of the audio transmission may be determined based on the second time (block 912). For example, the computing device 800 may determine the beginning of the audio transmission 804 within the audio signal 802 based on the second time. As a specific example, the computing device 800 may determine a transmission detection time 828 based on the second time. As explained above, the transmission detection time 828 may be determined to indicate the beginning of the audio transmission 804 within the audio signal 802. In certain instances, rather than determining the beginning of the audio transmission, the computing device 800 may determine a beginning of a portion of the audio transmission 804, such as a beginning of the predetermined portion 806 and/or a beginning of a portion of the audio transmission 804 containing the data 812 and/or other information (e.g., a header of the audio transmission 804). Upon determining the beginning of the audio transmission 804, all or part of the audio transmission 804 may be extracted from the audio signal 802 for further processing.

By utilizing comparisons of both real portions and imaginary portions of the expected sequence 814 in the comparisons with the audio transmission 804, the method 900 is able to both capture the computational efficiencies of performing real-valued comparisons and the improved accuracy of performing imaginary-valued comparisons. In this way, the method 900 is able to improve the accuracy with which audio transmissions 804 are identified within audio signals 802, without compromising the battery life and/or computing processing requirements of the computing device 800. Furthermore, by increasing the accuracy with which audio transmissions 804 are detected and identified, the method 900 may improve the ability for computing devices connected to transmitter/receiver arrays 300 to distinguish between audio transmissions received from different directions. For example, by more precisely determining the transmission detection times 828, computing devices may be better able to discern when different audio transmissions are received and may therefore be less likely to combine audio signals containing different audio transmissions, which would reduce the accuracy of subsequent processing of the audio transmissions.

Figure 10:
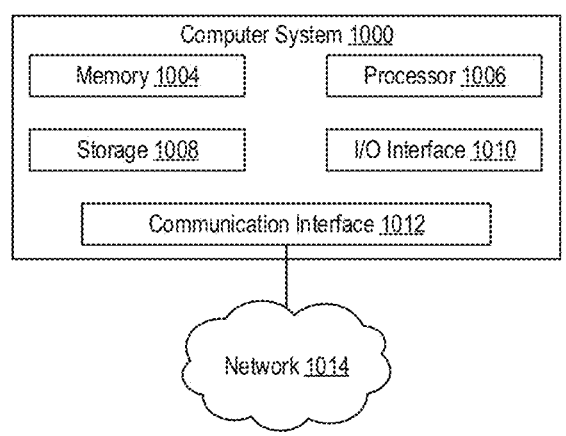
FIG. 10 illustrates a computing system according to an exemplary embodiment of the present disclosure.

FIG. 10 illustrates an example computer system 1000 that may be utilized to implement one or more of the devices and/or components of FIGS. 1 and 8, such as the computing devices 102, 104, 800. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates the computer system 1000 taking any suitable physical form. As example and not by way of limitation, the computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1006, memory 1004, storage 1008, an input/output (I/O) interface 1010, and a communication interface 1012. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 1006 includes hardware for executing instructions, such as those making up a computer program. As an example and not by way of limitation, to execute instructions, the processor 1006 may retrieve (or fetch) the instructions from an internal register, an internal cache, memory 1004, or storage 1008; decode and execute the instructions; and then write one or more results to an internal register, internal cache, memory 1004, or storage 1008. In particular embodiments, the processor 1006 may include one or more internal caches for data, instructions, or addresses. This disclosure contemplates the processor 1006 including any suitable number of any suitable internal caches, where appropriate. As an example and not by way of limitation, the processor 1006 may include one or more instruction caches, one or more data caches, and one or more translation lookaside buffers (TLBs). Instructions in the instruction caches may be copies of instructions in memory 1004 or storage 1008, and the instruction caches may speed up retrieval of those instructions by the processor 1006. Data in the data caches may be copies of data in memory 1004 or storage 1008 that are to be operated on by computer instructions; the results of previous instructions executed by the processor 1006 that are accessible to subsequent instructions or for writing to memory 1004 or storage 1008; or any other suitable data. The data caches may speed up read or write operations by the processor 1006. The TLBs may speed up virtual-address translation for the processor 1006. In particular embodiments, processor 1006 may include one or more internal registers for data, instructions, or addresses. This disclosure contemplates the processor 1006 including any suitable number of any suitable internal registers, where appropriate. Where appropriate, the processor 1006 may include one or more arithmetic logic units (ALUs), be a multi-core processor, or include one or more processors 1006. Although this disclosure describes and illustrates a particular processor, this disclosure contemplates any suitable processor.

In particular embodiments, the memory 1004 includes main memory for storing instructions for the processor 1006 to execute or data for processor 1006 to operate on. As an example, and not by way of limitation, computer system 1000 may load instructions from storage 1008 or another source (such as another computer system 1000) to the memory 1004. The processor 1006 may then load the instructions from the memory 1004 to an internal register or internal cache. To execute the instructions, the processor 1006 may retrieve the instructions from the internal register or internal cache and decode them. During or after execution of the instructions, the processor 1006 may write one or more results (which may be intermediate or final results) to the internal register or internal cache. The processor 1006 may then write one or more of those results to the memory 1004. In particular embodiments, the processor 1006 executes only instructions in one or more internal registers or internal caches or in memory 1004 (as opposed to storage 1008 or elsewhere) and operates only on data in one or more internal registers or internal caches or in memory 1004 (as opposed to storage 1008 or elsewhere). One or more memory buses (which may each include an address bus and a data bus) may couple the processor 1006 to the memory 1004. The bus may include one or more memory buses, as described in further detail below. In particular embodiments, one or more memory management units (MMUs) reside between the processor 1006 and memory 1004 and facilitate accesses to the memory 1004 requested by the processor 1006. In particular embodiments, the memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory implementations, this disclosure contemplates any suitable memory implementation.

In particular embodiments, the storage 1008 includes mass storage for data or instructions. As an example and not by way of limitation, the storage 1008 may include a hard disk drive (HDD), a floppy disk drive, flash memory, an optical disc, a magneto-optical disc, magnetic tape, or a Universal Serial Bus (USB) drive or a combination of two or more of these. The storage 1008 may include removable or non-removable (or fixed) media, where appropriate. The storage 1008 may be internal or external to computer system 1000, where appropriate. In particular embodiments, the storage 1008 is non-volatile, solid-state memory. In particular embodiments, the storage 1008 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1008 taking any suitable physical form. The storage 1008 may include one or more storage control units facilitating communication between processor 1006 and storage 1008, where appropriate. Where appropriate, the storage 1008 may include one or more storages 1008. Although this disclosure describes and illustrates particular storage, this disclosure contemplates any suitable storage.

In particular embodiments, the I/O Interface 1010 includes hardware, software, or both, providing one or more interfaces for communication between computer system 1000 and one or more I/O devices. The computer system 1000 may include one or more of these I/O devices, where appropriate. One or more of these I/O devices may enable communication between a person (i.e., a user) and computer system 1000. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 1010 may include one or more device or software drivers enabling processor 1006 to drive one or more of these I/O devices. The I/O interface 1010 may include one or more I/O interfaces 1010, where appropriate. Although this disclosure describes and illustrates a particular I/O interface, this disclosure contemplates any suitable I/O interface or combination of I/O interfaces.

In particular embodiments, communication interface 1012 includes hardware, software, or both providing one or more interfaces for communication (such as, for example, packet-based communication) between computer system 1000 and one or more other computer systems 1000 or one or more networks 1014. As an example and not by way of limitation, communication interface 1012 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 1014 and any suitable communication interface 1012 for the network 1014. As an example and not by way of limitation, the network 1014 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1012 for any of these networks, where appropriate. Communication interface 1012 may include one or more communication interfaces 1012, where appropriate. Although this disclosure describes and illustrates a particular communication interface implementations, this disclosure contemplates any suitable communication interface implementation.

The computer system 1000 may also include a bus. The bus may include hardware, software, or both and may communicatively couple the components of the computer system 1000 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   receiving an audio signal that contains an audio transmission, the audio transmission containing (i) a predetermined portion and (ii) data for transmission using the audio transmission;
   computing a first plurality of similarity measures between (i) a real portion of an expected sequence of complex values and (ii) a first plurality of portions of the audio signal, the first plurality of portions of the audio signal beginning at a first plurality of times;
   determining that a first portion of the audio signal from among the first plurality of portions of the audio signal corresponds to the largest of the first plurality of similarity measures, the first portion of the audio signal beginning at a first time from among the first plurality of times;
   computing a second plurality of similarity measures between (i) the real portion of the expected sequence and an imaginary portion of the expected sequence of complex values and (ii) a second plurality of portions of the audio signal, the second plurality of portions of the audio signal beginning at a second plurality of times;
   determining that a second portion of the audio signal from among the second plurality of portions of the audio signal corresponds to the largest of the second plurality of similarity measures, the second portion of the audio signal beginning at a second time from among the second plurality of times; and
   determining an arrival time of the audio transmission based on the second time.

2. The method of claim 1, wherein the second plurality of times occur within a predetermined threshold time difference of the first time.

3. The method of claim 2, wherein the predetermined threshold time difference is less than or equal to 1 millisecond.

4. The method of claim 3, wherein the predetermined time difference is less than or equal to 0.5 milliseconds.

5. The method of claim 2, wherein the predetermined threshold time difference is determined as a number of audio samples.

6. The method of claim 5, wherein the predetermined threshold time difference is less than or equal to 15 audio samples.

7. The method of claim 1, wherein the real portions of the expected sequence indicate magnitudes for samples of the expected sequence.

8. The method of claim 1, wherein the imaginary portions of the expected sequence indicate phase differences for samples of the expected sequence.

9. The method of claim 8, wherein the predetermined portion of the audio transmission is initially transmitted to include the real portion of the expected sequence and the phase differences indicated by the imaginary portion of the expected sequence.

10. The method of claim 1, wherein the first plurality of portions of the audio signal and the second plurality of portions of the audio signal contain only real-valued audio signals.

11. The method of claim 1, wherein the expected sequence of complex values is a continuous linear phase chirp signal.

12. The method of claim 1, wherein the at least one of the first plurality of similarity measures and the second plurality of similarity measures are calculated as correlation measures.

13. The method of claim 12, wherein the correlation measures include convolution measures.

14. A system comprising:
a processor; and
a memory storing instructions which, when executed by the processor, cause the processor to:
receive an audio signal that contains an audio transmission, the audio transmission containing (i) a predetermined portion and (ii) data for transmission using the audio transmission;
compute a first plurality of similarity measures between (i) a real portion of an expected sequence of complex values and (ii) a first plurality of portions of the audio signal, the first plurality of portions of the audio signal beginning at a first plurality of times;
determine that a first portion of the audio signal from among the first plurality of portions of the audio signal corresponds to the largest of the first plurality of similarity measures, the first portion of the audio signal beginning at a first time from among the first plurality of times;
compute a second plurality of similarity measures between (i) the real portion of the expected sequence and an imaginary portion of the expected sequence of complex values and (ii) a second plurality of portions of the audio signal, the second plurality of portions of the audio signal beginning at a second plurality of times;
determine that a second portion of the audio signal from among the second plurality of portions of the audio signal corresponds to the largest of the second plurality of similarity measures, the second portion of the audio signal beginning at a second time from among the second plurality of times; and
determine an arrival time of the audio transmission based on the second time.

15. The system of claim 14, wherein the second plurality of times occur within a predetermined threshold time difference of the first time.

16. The system of claim 15, wherein the predetermined threshold time difference is determined as a number of audio samples.

17. The system of claim 14, wherein the imaginary portions of the expected sequence indicate phase differences for samples of the expected sequence.

18. The system of claim 17, wherein the predetermined portion of the audio transmission is initially transmitted to include the real portion of the expected sequence and the phase differences indicated by the imaginary portion of the expected sequence.

19. The system of claim 14, wherein the first plurality of portions of the audio signal and the second plurality of portions of the audio signal contain only real-valued audio signals.

20. The system of claim 14, wherein the expected sequence of complex values is a continuous linear phase chirp signal.

* * * * *